US011044895B2

(12) United States Patent
Grajcar et al.

(10) Patent No.: US 11,044,895 B2
(45) Date of Patent: Jun. 29, 2021

(54) SYSTEM AND METHOD FOR PROMOTING SURVIVAL RATE IN LARVAE

(71) Applicant: SIGNIFY NORTH AMERICA CORPORATION, Somerset, NJ (US)

(72) Inventors: Zdenko Grajcar, Orono, MN (US); Juliette Delabbio, Natchitoches, LA (US)

(73) Assignee: SIGNIFY NORTH AMERICA CORPORATION, Somerset, NJ (US)

(*) Notice: Subject to any disclaimer, the term of this patent is extended or adjusted under 35 U.S.C. 154(b) by 147 days.

(21) Appl. No.: 15/591,341

(22) Filed: May 10, 2017

(65) Prior Publication Data
US 2017/0325428 A1    Nov. 16, 2017

Related U.S. Application Data

(60) Provisional application No. 62/334,559, filed on May 11, 2016.

(51) Int. Cl.
A01K 63/06 (2006.01)
F21S 8/04 (2006.01)
F21V 29/77 (2015.01)
A01K 61/17 (2017.01)
H05B 45/00 (2020.01)
H05B 45/10 (2020.01)
H05B 45/20 (2020.01)
H05B 47/16 (2020.01)

(52) U.S. Cl.
CPC .............. A01K 63/06 (2013.01); A01K 61/17 (2017.01); F21S 8/046 (2013.01); F21V 29/773 (2015.01); H05B 45/00 (2020.01); H05B 45/10 (2020.01); H05B 45/20 (2020.01); H05B 47/16 (2020.01); Y02A 40/81 (2018.01); Y02B 20/40 (2013.01)

(58) Field of Classification Search
CPC ........ A01K 61/10; A01K 61/17; A01K 63/06; A01K 63/17
USPC ................................................ 119/215, 217
See application file for complete search history.

(56) References Cited

U.S. PATENT DOCUMENTS

| 2,149,764 | A | 3/1939 | Rudolf |
| 2,626,135 | A | 1/1953 | Semer |
| 2,709,984 | A | 6/1955 | Marks |
| 2,824,728 | A | 2/1958 | Crawford |
| 3,130,917 | A | 4/1964 | Aghnides |
| 3,273,865 | A | 9/1966 | White |

(Continued)

FOREIGN PATENT DOCUMENTS

| CA | 2331245 | 11/2001 |
| CN | 1042039 | 5/1990 |

(Continued)

OTHER PUBLICATIONS

International Patent Application Serial No. PCT/US2012/068701 International Search Report dated Feb. 15, 2013, 2 pgs.

(Continued)

Primary Examiner — Christopher D Hutchens

(57) ABSTRACT

A method and lighting system for promoting survival of larvae from a plurality of eggs within a containment unit. The lighting system includes at least one lighting device emitting light energy in a pre-determined narrow range of wavelengths and a pre-determined lighting intensity that promotes the survival of the larvae within the containment unit.

13 Claims, 10 Drawing Sheets

(56) References Cited

U.S. PATENT DOCUMENTS

| | | |
|---|---|---|
| 3,563,204 A | 2/1971 | Szilagyi |
| 3,747,904 A | 7/1973 | Gross |
| 3,828,176 A | 8/1974 | Goldman et al. |
| 3,916,832 A | 11/1975 | Sweeney |
| 3,923,660 A | 12/1975 | Kottmeier |
| 3,939,802 A | 2/1976 | Neff |
| 3,951,104 A | 4/1976 | Neff |
| 3,998,186 A | 12/1976 | Hodges |
| 4,026,805 A | 5/1977 | Fowler |
| 4,137,869 A | 2/1979 | Kipping |
| 4,146,479 A | 3/1979 | Brown |
| 4,248,707 A | 2/1981 | Granger |
| 4,253,418 A | 3/1981 | Lockwood et al. |
| 4,379,437 A | 4/1983 | Knowles |
| 4,428,837 A | 1/1984 | Kronenberg |
| 4,475,480 A | 10/1984 | Bodker, Jr. |
| 4,554,759 A | 11/1985 | Edling et al. |
| 4,645,603 A | 2/1987 | Frankl |
| 4,699,086 A | 10/1987 | Mori |
| 4,699,087 A | 10/1987 | Mori |
| 4,703,719 A | 11/1987 | Mori |
| 4,716,024 A | 12/1987 | Pera |
| 4,726,321 A | 2/1988 | Malone et al. |
| 4,761,228 A | 8/1988 | Weisenbarger et al. |
| 5,027,550 A | 7/1991 | Mori |
| 5,077,932 A | 1/1992 | Hetherington |
| 5,085,810 A | 2/1992 | Burrows |
| 5,133,145 A | 7/1992 | McDonald |
| 5,161,481 A | 11/1992 | Laufer |
| 5,165,778 A | 11/1992 | Matthias et al. |
| 5,211,469 A | 5/1993 | Matthias et al. |
| 5,293,839 A | 3/1994 | Jorgensen |
| 5,353,746 A | 10/1994 | Del Rosario |
| 5,713,303 A | 2/1998 | Willinsky et al. |
| 5,778,823 A | 7/1998 | Adey et al. |
| 5,848,837 A | 12/1998 | Gustafson |
| 5,850,806 A | 12/1998 | Mark et al. |
| 5,882,514 A | 3/1999 | Fletcher |
| 5,937,791 A | 8/1999 | Baugher et al. |
| 6,030,108 A | 2/2000 | Ishiharada et al. |
| 6,044,798 A | 4/2000 | Foster et al. |
| 6,192,833 B1 | 2/2001 | Brune et al. |
| 6,203,170 B1 | 3/2001 | Patrick et al. |
| 6,280,078 B1 | 8/2001 | Lewis |
| 6,347,908 B1 | 2/2002 | Safwat |
| 6,361,192 B1 | 3/2002 | Fussell et al. |
| 6,421,952 B1 | 7/2002 | Vascocu |
| 6,447,681 B1 | 9/2002 | Carlberg et al. |
| 6,564,747 B2 | 5/2003 | Harris, Jr. et al. |
| 6,743,365 B1 | 6/2004 | Marlowe |
| 6,851,387 B2 | 2/2005 | Untermeyer et al. |
| 7,000,567 B1 | 2/2006 | Hsiao |
| 7,069,876 B2 | 7/2006 | Harris, Jr. et al. |
| 7,195,368 B2 | 3/2007 | Heath |
| 7,220,018 B2 | 5/2007 | Crabb et al. |
| 7,287,488 B2 | 10/2007 | Taylor et al. |
| 7,500,776 B1 | 3/2009 | Buczko |
| 7,800,119 B2 | 9/2010 | He et al. |
| 7,845,814 B2 | 12/2010 | Crabb et al. |
| 7,878,674 B2 | 2/2011 | Crabb et al. |
| 7,906,793 B2 | 3/2011 | Negley |
| 8,006,646 B2 | 8/2011 | Grad |
| 8,057,060 B2 | 11/2011 | Fredricks |
| 8,100,560 B2 | 1/2012 | Ahland et al. |
| 8,111,001 B2 | 2/2012 | Underwood et al. |
| 8,230,815 B2 | 7/2012 | Fredricks |
| 8,373,363 B2 | 2/2013 | Grajcar |
| 8,531,136 B2 | 9/2013 | Grajcar |
| 8,568,009 B2 | 10/2013 | Chiang et al. |
| 8,593,044 B2 | 11/2013 | Grajcar |
| 8,643,308 B2 | 2/2014 | Grajcar |
| 8,950,361 B1 | 2/2015 | Pierce |
| 9,016,240 B2 | 4/2015 | Delabbio |
| 2001/0045189 A1 | 11/2001 | McNeil |
| 2002/0191396 A1 | 12/2002 | Reiff et al. |
| 2003/0222503 A1 | 12/2003 | Lam et al. |
| 2004/0107914 A1 | 6/2004 | Untermeyer et al. |
| 2004/0211367 A1 | 10/2004 | Jablonsky |
| 2005/0029178 A1 | 2/2005 | Haddas |
| 2005/0120970 A1 | 6/2005 | Massingill et al. |
| 2005/0128751 A1 | 6/2005 | Roberge et al. |
| 2005/0135104 A1 | 6/2005 | Crabb et al. |
| 2005/0224010 A1 | 10/2005 | Nakayama et al. |
| 2005/0232766 A1 | 10/2005 | Tsai |
| 2005/0236998 A1 | 10/2005 | Mueller et al. |
| 2007/0069663 A1 | 3/2007 | Burdalski et al. |
| 2007/0159833 A1 | 7/2007 | Netzel et al. |
| 2007/0176182 A1 | 7/2007 | Wen et al. |
| 2007/0268693 A1 | 11/2007 | Crabb et al. |
| 2007/0268702 A1 | 11/2007 | McFadden |
| 2007/0297906 A1 | 12/2007 | Wu |
| 2008/0173249 A1 | 7/2008 | Miller |
| 2008/0217225 A1 | 9/2008 | Allis |
| 2008/0273331 A1 | 11/2008 | Moss et al. |
| 2008/0316732 A1* | 12/2008 | Blake .................. F21V 23/0464 362/101 |
| 2009/0050067 A1 | 2/2009 | Parsons et al. |
| 2009/0080187 A1 | 3/2009 | Chou |
| 2009/0140668 A1 | 6/2009 | Crabb et al. |
| 2010/0005711 A1 | 1/2010 | McNeff |
| 2010/0045198 A1 | 2/2010 | Lee et al. |
| 2010/0081835 A1 | 4/2010 | Wu et al. |
| 2010/0236137 A1 | 9/2010 | Wu et al. |
| 2010/0239441 A1 | 9/2010 | Bade et al. |
| 2010/0267126 A1 | 10/2010 | Jacobs et al. |
| 2010/0268390 A1 | 10/2010 | Anderson |
| 2011/0012157 A1 | 1/2011 | Shi |
| 2011/0045564 A1 | 2/2011 | Dhamwichukorn |
| 2011/0078949 A1 | 4/2011 | Schuster et al. |
| 2011/0089830 A1 | 4/2011 | Pickard et al. |
| 2011/0101410 A1 | 5/2011 | Lin et al. |
| 2011/0109244 A1 | 5/2011 | Grajcar |
| 2011/0122645 A1 | 5/2011 | Donham et al. |
| 2011/0209400 A1 | 9/2011 | Rooymans |
| 2011/0210678 A1 | 9/2011 | Grajcar |
| 2011/0253056 A1 | 10/2011 | Fredricks |
| 2011/0273098 A1 | 11/2011 | Grajcar |
| 2011/0279015 A1 | 11/2011 | Negley et al. |
| 2011/0280011 A1 | 11/2011 | Crabb et al. |
| 2011/0291135 A1 | 12/2011 | Hsieh et al. |
| 2011/0303927 A1 | 12/2011 | Sanpei et al. |
| 2011/0316014 A1 | 12/2011 | Hiroyuki |
| 2011/0316420 A1 | 12/2011 | Chang et al. |
| 2011/0317416 A1 | 12/2011 | Oyaizu et al. |
| 2012/0013238 A1 | 1/2012 | Jonsson |
| 2012/0040449 A1 | 2/2012 | Zambaux |
| 2012/0044713 A1 | 2/2012 | Chiang et al. |
| 2012/0060763 A1 | 3/2012 | Lin |
| 2012/0098458 A1 | 4/2012 | Dai et al. |
| 2012/0117869 A1 | 5/2012 | Javan et al. |
| 2012/0129245 A1 | 5/2012 | Neeb et al. |
| 2012/0149091 A1 | 6/2012 | Wilkerson et al. |
| 2012/0184001 A1* | 7/2012 | Stephen .................. A01K 61/60 435/134 |
| 2012/0212129 A9 | 8/2012 | Chou et al. |
| 2012/0268918 A1 | 10/2012 | Grajcar |
| 2012/0312243 A1 | 12/2012 | Rusch |
| 2013/0027947 A1 | 1/2013 | Villard et al. |
| 2013/0058103 A1 | 3/2013 | Jiang et al. |
| 2013/0118414 A1 | 5/2013 | Komada et al. |
| 2013/0152864 A1 | 6/2013 | Grajcar et al. |
| 2013/0153938 A1 | 6/2013 | Grajcar |
| 2013/0157394 A1 | 6/2013 | Grajcar |
| 2013/0174792 A1* | 7/2013 | Delabbio ................ A01K 63/06 119/200 |
| 2013/0220940 A1 | 8/2013 | Galletta |
| 2013/0220944 A1 | 8/2013 | Galletta, Jr. |
| 2013/0333627 A1 | 12/2013 | Pohl |
| 2014/0098531 A1* | 4/2014 | Grajcar .................. F21K 9/233 362/235 |
| 2014/0158050 A1* | 6/2014 | Grajcar ................ A01K 45/007 119/6.8 |
| 2015/0150195 A1 | 6/2015 | Grajcar |

(56) References Cited

U.S. PATENT DOCUMENTS

| | | | |
|---|---|---|---|
| 2015/0230440 A1* | 8/2015 | Grajcar | A01K 63/06 119/267 |
| 2015/0237890 A1 | 8/2015 | Grajcar | |
| 2016/0021855 A1 | 1/2016 | Grajcar et al. | |
| 2016/0037756 A1 | 2/2016 | Grajcar et al. | |
| 2016/0183500 A1* | 6/2016 | Delabbio | A01K 63/06 119/204 |
| 2016/0317989 A1 | 11/2016 | Nagler et al. | |
| 2016/0353716 A1* | 12/2016 | Tanase | H05B 47/11 |
| 2017/0006840 A1* | 1/2017 | Barry | A01K 63/045 |
| 2017/0049082 A1 | 2/2017 | Kim et al. | |
| 2018/0000055 A1* | 1/2018 | Tanase | A01K 63/06 |

FOREIGN PATENT DOCUMENTS

| | | |
|---|---|---|
| CN | 1280764 | 1/2001 |
| CN | 2699664 | 5/2005 |
| CN | 1692700 | 11/2005 |
| CN | 201344401 | 11/2009 |
| CN | 101868529 | 10/2010 |
| CN | 201801419 | 4/2011 |
| CN | 201944685 | 8/2011 |
| CN | 102438373 | 5/2012 |
| EP | 1508272 | 2/2005 |
| EP | 1610593 | 12/2005 |
| EP | 2284440 | 2/2011 |
| JP | S6268591 | 3/1987 |
| JP | 2002143856 | 5/2002 |
| JP | 2005111378 | 4/2005 |
| JP | 4241870 | 3/2009 |
| JP | 2011134903 | 7/2011 |
| JP | 4796027 | 10/2011 |
| JP | 2012065625 A * | 4/2012 |
| TW | 201216841 | 5/2012 |
| WO | WO2005015987 | 2/2005 |
| WO | WO2005109086 | 11/2005 |
| WO | WO2006137741 | 12/2006 |
| WO | WO2009066231 | 5/2009 |
| WO | WO2011019288 | 2/2011 |
| WO | WO2011068843 | 6/2011 |
| WO | WO2014039823 | 3/2014 |
| WO | WO2014197815 | 12/2014 |

OTHER PUBLICATIONS

International Patent Application Serial No. PCT/US2012/068701 Written Opinion dated Feb. 15, 2013, 4 pgs.
International Preliminary Report on Patentability issued in International Application No. PCT/US2012/068701 dated Jun. 17, 2014, 5 pgs.
International Application Serial No. PCT/US2013/058511, International Preliminary Report on Patentability dated Mar. 10, 2015, 6 pgs.
International Application Serial No. PCT/US2013/058511, International Search Report dated Dec. 4, 2013, 3 pgs.
International Application Serial No. PCT/US2013/058511, Written Opinion dated Dec. 4, 2013, 5 pgs.
International Application Serial No. PCT/US2012/069728 Preliminary Report on Patentability dated Jun. 17, 2014, 5 pgs.
International Application Serial No. PCT/US2012/069728 International Search Report dated Jun. 20, 2013, 2 pgs.
International Application Serial No. PCT/US2012/069728 Written Opinion dated Jun. 14, 2014, 4 pgs.
International Application Serial No. PCT/US2012/069379 Preliminary Report on Patentability dated Jun. 17, 2014 10 pgs.
International Application Serial No. PCT/US2012/069379, International Search Report dated Feb. 25, 2013, 2 pgs.
International Application Serial No. PCT/US2012/069379, Written Opinion dated Feb. 25, 2013, 9 pgs.
International Application Serial No. PCT/US2014/041331, International Preliminary Report on Patentability dated Dec. 17, 2015, 5 pgs.
International Application Serial No. PCT/US2014/041331, International Search Report dated Oct. 16, 2014, 3 pgs.
International Application Serial No. PCT/US2014/041331, Written Opinion dated Oct. 16, 2014, 4 pgs.
Hongshan Su: "Fish Culture in Light Net Pen Underwater" (title also translated as "Test of Fish Farming in Underwater Lighting Cage"), Journal of Zoology, vol. 2, 1983, pp. 31-32, with English translation, 4 pgs.
McConnaughy, Janet; Researcher Uses Light to Grow Bigger Crawfish http://www.dailycomet.com/article/20110706/WIRE/110709753?template=printpicart, Jul. 31, 2014., 3 pgs.

* cited by examiner

SYSTEM AND METHOD FOR PROMOTING SURVIVAL RATE IN LARVAE

CROSS REFERENCE

This application claims benefit of U.S. Provisional Patent Application entitled "System and Method for Promoting Survival Rate in Larvae", Ser. No. 62/334,559, which was filed by Z. Grajoar et al. on May 11, 2016 the entire contents of which are incorporated herein by reference.

BACKGROUND

This invention relates to promoting hatching and survival of larvae from eggs. More specifically this invention relates to a lighting system and method for promoting hatchability in eggs.

Egg Production, in fish such as red drum, tilapia and the like have become a commercial industry. In particular eggs are incubated and hatched into larvae and then harvested. Specifically after hatch the larvae must feed and through the entire hatching process before the larvae are removed from the incubation environment and taken for growth.

A major problem in the art exists in the marketplace in efficiently hatching and raising larvae before removal. In particular hatchability of eggs and survivability of larvae in indoor facilities is typically extremely low and can be as little as 20% survivability of larvae from harvested eggs or less. In order to improve survivability items are monitored such as water temperature, feed and the like to maximize survivability of the larvae.

Lighting in this environment is typically incidental and produced from lighting provided in facilities for human workers that tend to the eggs and larvae. Previous studies have shown that generally light can be used to assist in promoting health of hatched larvae, but has not proven to greatly increase survivability in such facilities. Thus, a need in the art exists for increasing survivability of fish of indoor facilities through the harvest of the larvae from the hatching facility.

Therefore a principle object of the present invention is to provide a system that promotes hatchability in a commercial setting.

Another object of the present invention is increase survivability of larvae through harvest in a hatching facility.

SUMMARY OF THE INVENTION

A method of promoting survive survival of larvae from a Plurality of eggs and system for accomplishing the same. A containment unit for housing aquatic life is provided and a lighting device having a plurality of lighting elements is placed in spaced relation to the containment unit. The lighting device irradiates the plurality of larvae in the containment unit with light having narrow bands of predetermined wavelengths thereby promoting survival of the larvae.

DETAILED DESCRIPTION OF A PREFERRED EMBODIMENT

Figure 1:
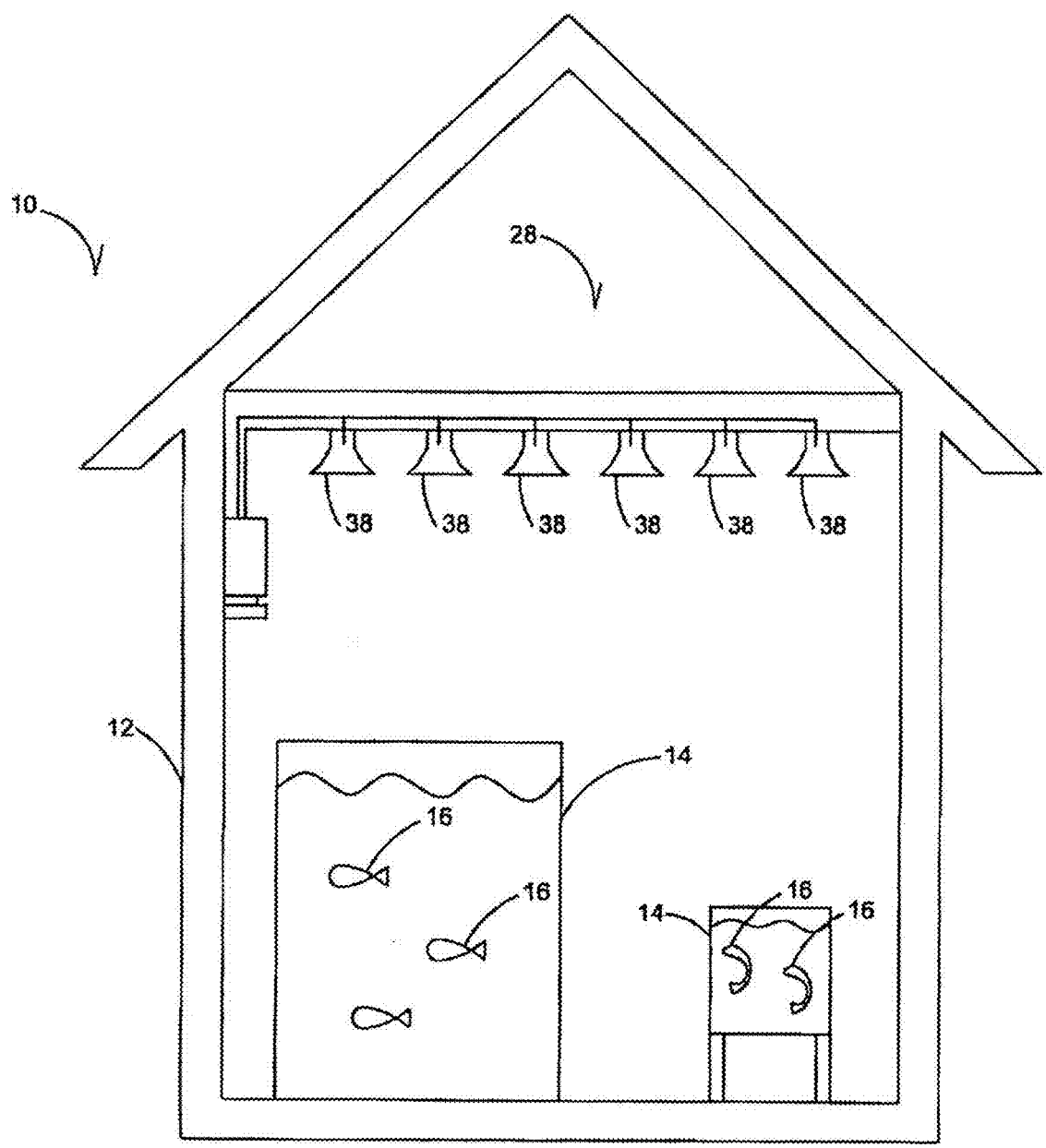
FIG. 1 is a side plan view of an aquaculture facility.
Figure 2:
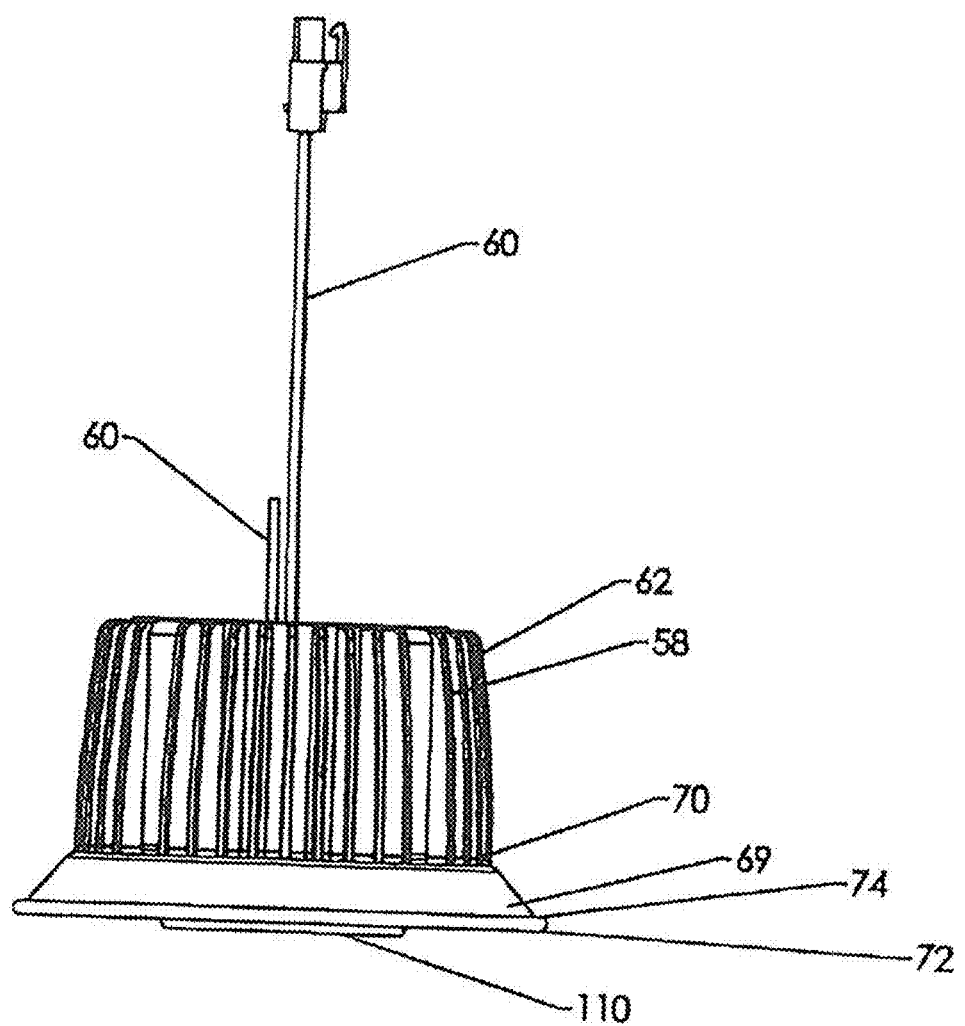
FIG. 2 is a side plan view of a lighting device of a lighting system.
Figure 3:
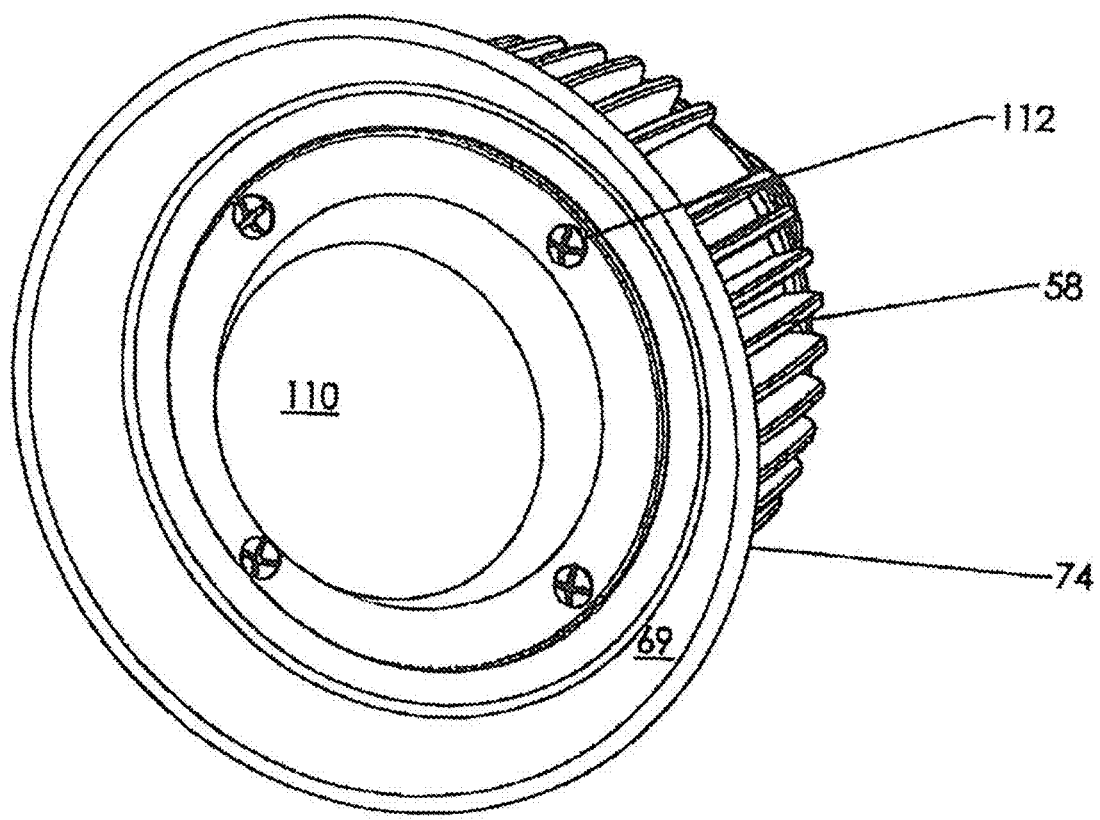
FIG. 3 is a side perspective view of a lighting device of a lighting system.

The figures show an indoor facility 10 that includes a dwelling 12 such as a building. The dwelling 12 either has a plurality of containment units 14 such as tanks, pools or the like for housing eggs 16 of a predetermined aquatic life 16. In one embodiment the eggs are red drum eggs. In particular the plurality of eggs are clustered together with the amount of eggs determined by total mass of the eggs. Specifically, because of the small size of the eggs and amount of eggs provided, the total amount of eggs is measured in weight of eggs instead of an exact count.

The figure also shows a lighting system 28 that in one embodiment includes a plurality of electrical conduit bodies 30 that receive and electrical input from an electrical source 32. The electrical conduit bodies 30 house wiring 34 that extend to provide an electric excitation signal to different areas in the dwelling. In one embodiment the wiring is electrically connected to a socket 36 to receive a lighting assembly 38.

Alternatively, any style of power source, including but not limited to Edison bases, junction boxes, hanging assemblies or the like can be presented without falling outside of the present disclosure and the disclosure is not considered limited. In one embodiment the lighting system 28 incorporates a junction box that is water resistant or water proof, depending on the requirements of the location of the system. This water resistance is an important feature of the system, allowing application in areas where there is significant humidity and accidental contact with water. In another embodiment the light is secured to the apex of a roof 39, in a junction box or otherwise, to evenly distribute light.

The lighting assembly 38 includes a base 40 having electrical conducting elements 42 therein that threadably and electrically connects within the socket 36 as is known in the art. The base 40 is either threadably received or compression fit onto a frustroconally shaped body 44 having a hollow interior 46 and a sidewall 48 that extends outwardly and away from a first end 50 having a first diameter to a second end 52 having a second diameter greater than the first diameter. In this manner when waste or water is sprayed on the body 44 the material flows downwardly and off the assembly 38. At the second end is a ring element 54 that is of size and shape to engage a sealing element 56 that in a preferred embodiment is made from an elastic material that expands upon compression. The sealing element 56 is secured between the ring element 54 and heat sink 58 to provide a water tight seal therebetween. In this manner electrical wiring 60 is electrically connected to the conductive body through the body 44 and heat sink within a water tight assembly 38.

In an alternative embodiment a socket 36 is not presented and instead the wiring is directly provided. In this embodiment the body 44 with the base 40 are not provided and instead the electrical wiring 60 disposed through the heat sink is directly or hard wired to the wiring 34 of the conduit to provide a direct electrical connection. The heat sink is then threadably and/or sealing connected to the conduit again to provide a water tight seal to prevent water from being within the interior of the heat sink 58 and being exposed to the electrical wiring 60.

The heat sink 58 in a preferred embodiment is made of a plastic material and has a plurality of fin elements 62 that assist in conveying heat through the, sink 58. The heat sink 58 extends from a first end 64 adjacent the conduit bodies 30 that receives the sealing element 56 in one embodiment and is sealed to a conduit body 30 in another to second end 66. The second end 66 is secured to a diffusion element 68 that has a frustroconical shape having a sidewall 69 that extends from a first end 70 outwardly and downwardly from the heat sink 58 to an open second end 72 having a diameter slightly greater than the diameter of the first end 70 and terminating in a lip element 74. By being sloped at an angle and downwardly, again, water, feces and other materials, often known to swine facilities 10 flow off the diffusion element 68, yet the lip element 74 keeps a robust design to withstand the harsh environment.

Figure 4:
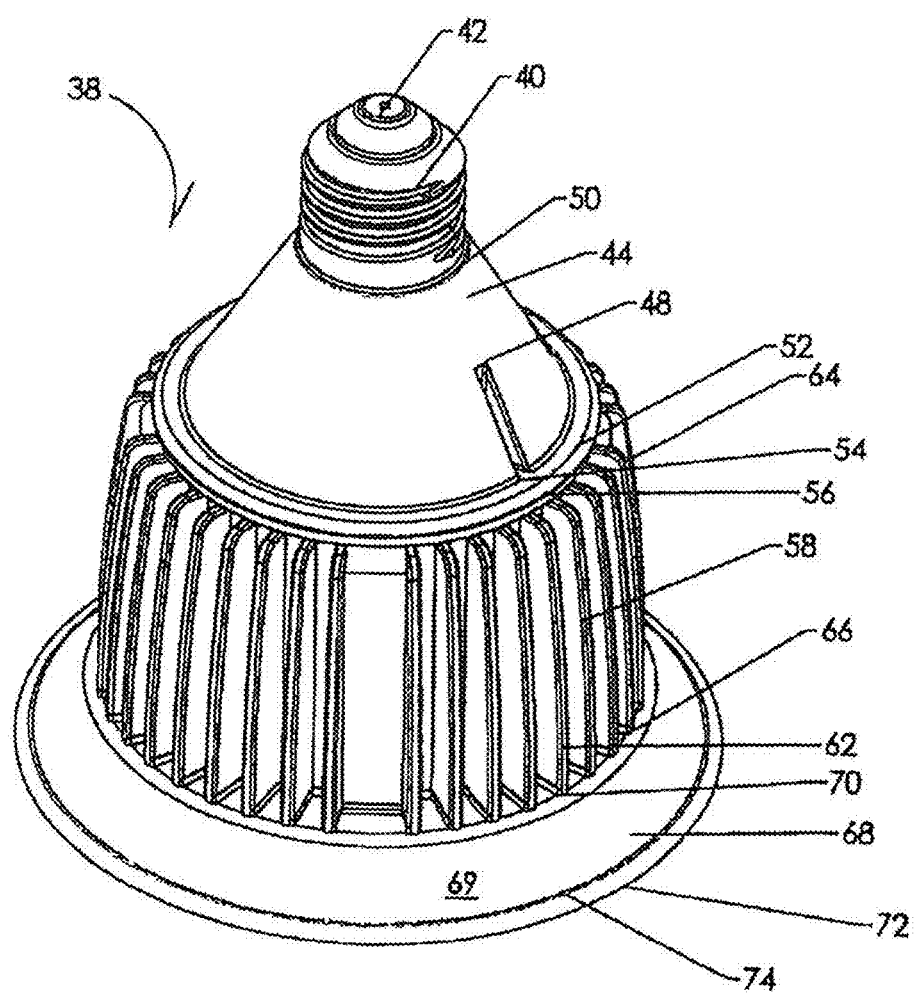
FIG. 4 is a top perspective view of a lighting device of a lighting system.
Figure 5:
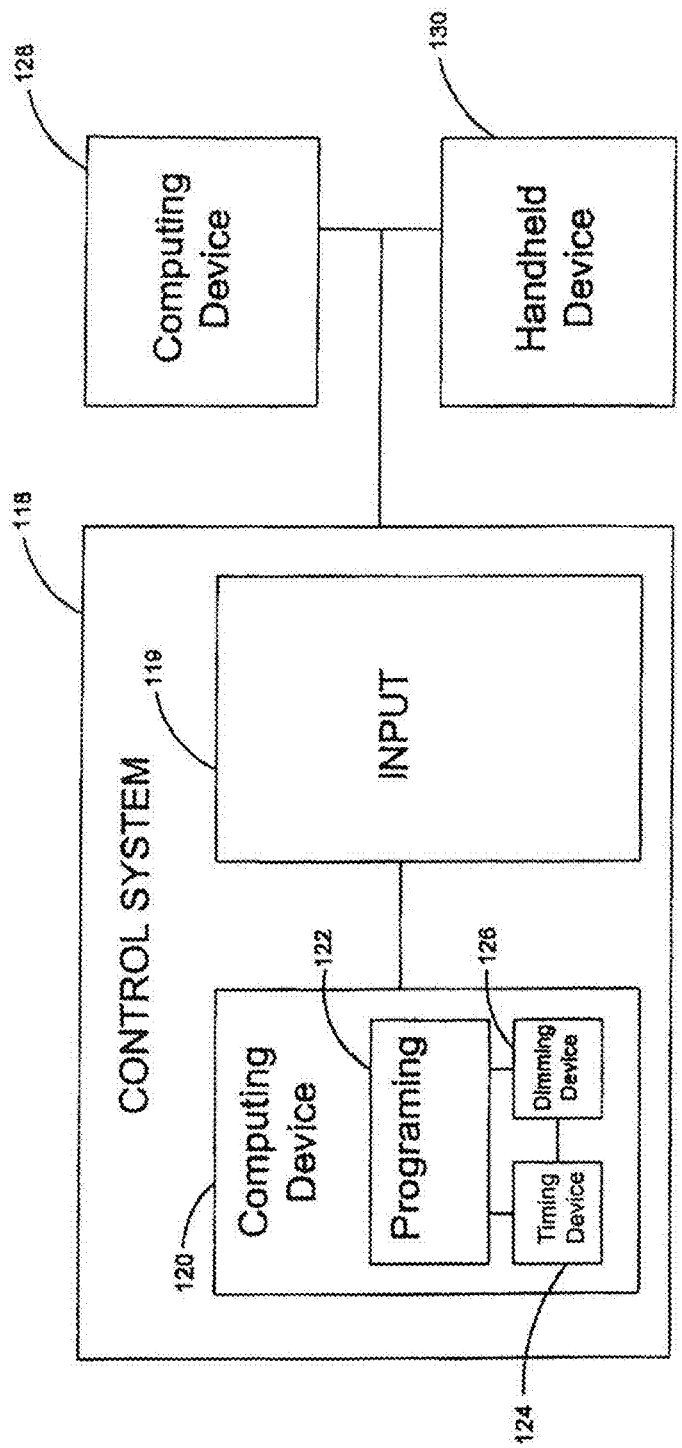
FIG. 5 is a schematic diagram of a control system for a lighting system.
Figure 6:
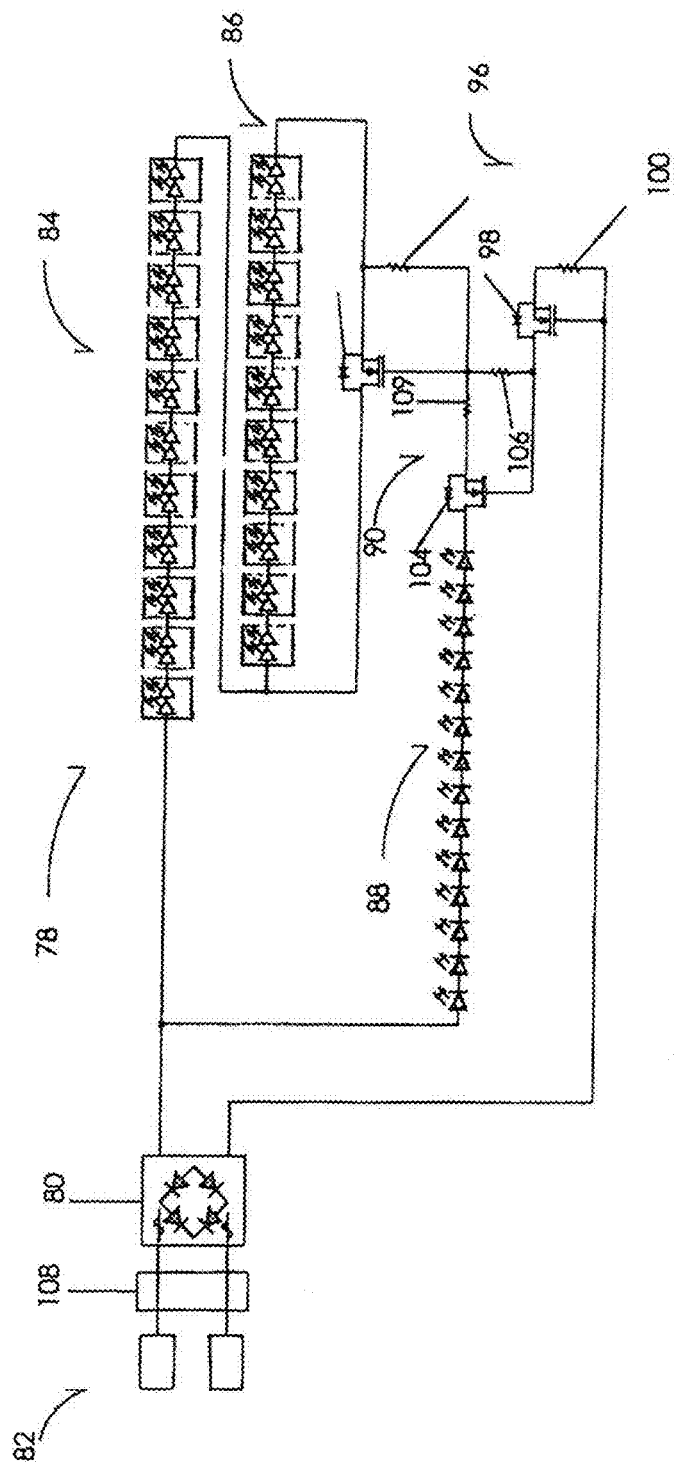
FIG. 6 is a schematic diagram of circuitry of a lighting system.
Figure 7:
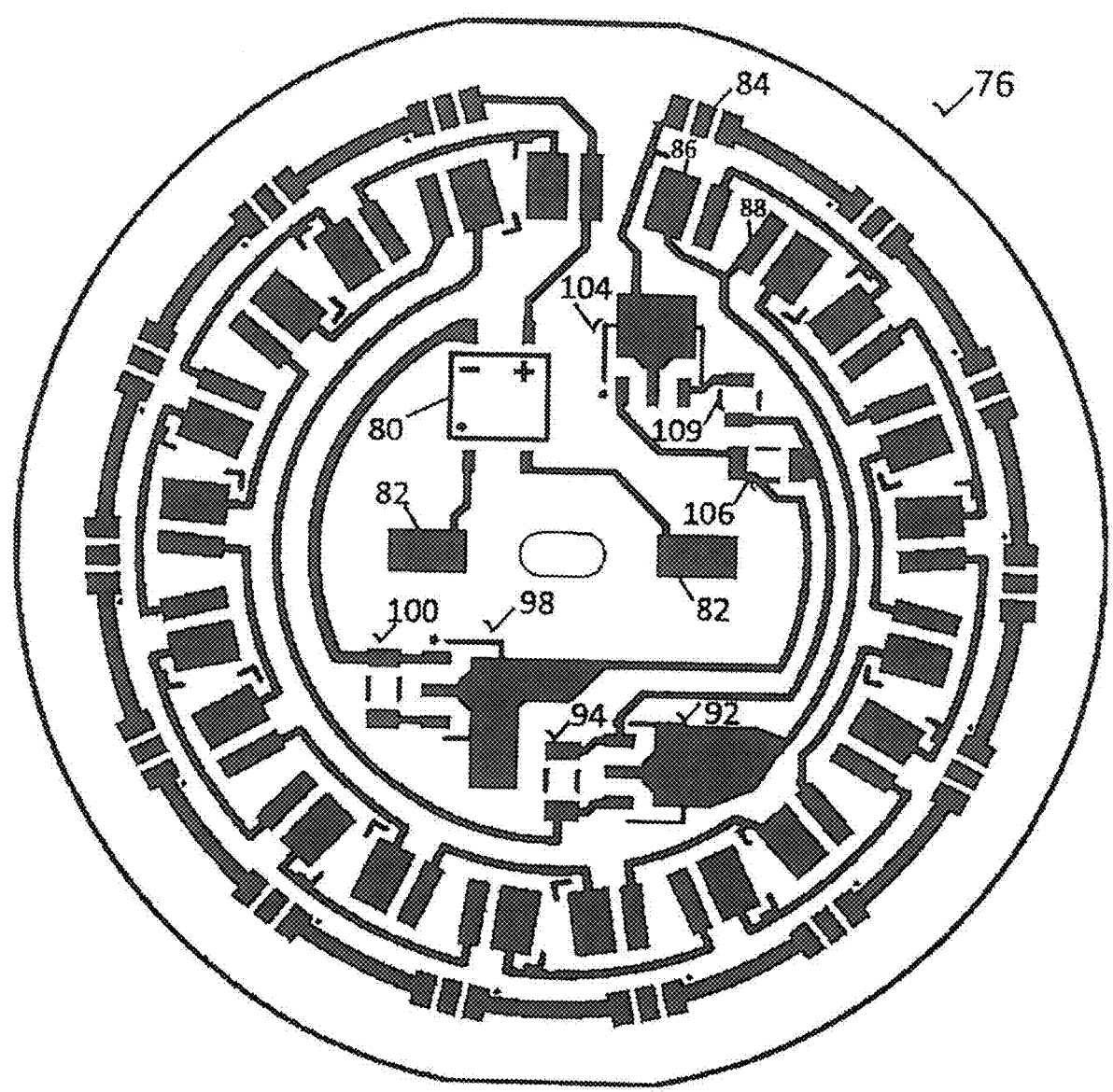
FIG. 7 is a top plan view of a substrate with circuitry of a lighting device of a lighting system.

A substrate 76 is also secured to the second end 66 of the heat sink 58 and in one embodiment has a generally round shape. The substrate also in one embodiment is a printed circuit board. FIG. 4 shows the substrate 76 having driving circuitry 78. The circuitry is similar to that taught in US. Pat. No. 8,373,363 entitled Reduction of Harmonic Distortion for LED Loads, by Z. Grajcar and issued on Feb. 12, 2013 and U.S. patent application entitled "Color Temperature Shift Control for Dimmable AC LED Lighting," Ser. No. 12/824,215, which was filed by Z. Grajcar on Jun. 27, 2010, the entire contents of each of which are incorporated herein by reference.

The circuitry 78 of the Present invention includes a rectifying device 80 that receives Current from an AC source 82 and includes a first group of light emitting diodes 84 arranged in series with a second group of light emitting diodes 86, both of which comprise diodes emitting white light or a composite white light. A third group of light emitting diodes 88 comprising diodes emitting red light are presented in parallel to the first and second groups of diodes 84 and 86. Red light emitted is considered any light having a wavelength approximately between 620 nm and 780 nm. Alternatively light emitting diodes having providing blue light, or having a wavelength approximately between 400 nm and 500 nm could be used without falling outside the scope of this invention. The threshold voltage of the third group of light emitting diodes 88 in one embodiment is set lower than the threshold voltage of the first group of light emitting diodes 84 such that the third group of light emitting diodes 88 turn on first as voltage is increased.

A bypass path 90 is presented with a first impedance element 92, that in one embodiment is a transistor. In a preferred embodiment the first impedance element 92 is a depletion MOSFET, though a p-channel MOSFET, n-channel MOSFET or the like can be used without falling outside the scope of this disclosure, even if an additional transistor is required for functionality purposes. A first resistor 94 is also provided to control the flow of current through the first impedance element 92 to provide smooth and continuous current flow.

A current path 96 is also provided with a second impedance element 98 that similarly in one embodiment is a depletion MOSFET. Similar to the bypass path 90 the current path 96 utilizes a second resistor 100 again to control the impedance element 98. Similarly also, a current path 102 is provided between the third group of light emitting diodes 88 and first and second groups of light emitting diodes 84 and 86. Again, this current path 102 utilizes a third impedance element 104 and third resistor 106 to provide similar functionality as the other bypass paths. In particular, this third impedance element 104 acts as a switch to stop the flow of current through the third group of light emitting diodes 88 to eliminate the wavelength of light, such as red emitted by the third group of light emitting diodes 88.

When a dimming device 108 is electrically connected to the circuit and the voltage begins dropping, current flow to the second group of diodes 86 drops before the first group of light emitting diodes 84, dimming out a group of white diodes. Then as dimming continues and a threshold current is reached the first group of light emitting diodes 84 begin to dim. Thus, again white light is slowly dimmed and eliminated from the output light. In this manner only the third group of light emitting diodes 88 that are red remain providing light. A supplemental resistor 109 optionally is provided to limit current in the system and to improve efficiencies.

Therefore the assembly dims to produce a red light. Consequently, with a programmable dimming device the lighting assembly 38 can provide a combination of white and red light throughout, a 24 hour period. One skilled in the art will appreciate that using this arrangement that the groups of light emitting diodes 84, 86 and 88 can be chosen so that Predetermined lighting treatments having spectral content with Percentage (%) of relative luminous power showing peaks at predetermined levels are accomplished. Therefore, provided is the exact spectral content needed for the aquatic life 16. Thus the dimming device 126 need only be actuated to provide both the spectrum of wavelengths at the % of relative luminous power for each wavelength desired and simultaneously provide the desired intensity (300 lux, 600 lux, 900 lux or otherwise) the lighting assembly 38 emits at the surface of the water and into the containment, unit 14.

A lens element 110 is secured to the heat sink 58, diffusion element 68 or both. In one embodiment fastening elements 112 are utilized to provide the connection. In Particular the lens element 110 is secured to provide a water tight seal so that water cannot encroach the interior of the assembly 38.

In addition the LEDs 86 are spaced equidistant about the substrate 76 to provide even or uniform directional lighting. Specifically, light emitted from the diodes equally present the same lumen output such that lighting assemblies 38 can be spaced, equidistant to ensure even and uniform lighting throughout a dwelling and onto the tanks 14 housing the aquatic life. In singular covered units 17, the lighting assembly 38 or assemblies 38 are placed so that there is even illumination (lux) on the surface area of the air/water interface and at the substrate area of the unit. In particular the assembly is designed and assembly or assemblies 38 positioned to provide uniform lux at the air/water interface to minimize effect on the aquatic life 16 as a result of lighting changes or inconsistencies.

Consequently, with a programmable dimming device 108 the lighting assembly 38 can provide light throughout, a 24 hour Period to optimize conditions for experimentation. Specifically, the dimming device 108 can be programmed to gradually turn on at very low intensity levels and gradually over a predetermined time period, such as in one example 2 hours go, from darkness to a maximum intensity. Thus, with the uniform lighting and gradual increase of intensity, the lighting assemblies 38 have minimal effect of aquatic life 16 that is being tested within tanks 14. Similarly, at night, when it is time for individuals to leave the dimming device 108 is programed to gradually decrease lumen intensity until the assemblies 38 no longer emit light. Again, in this manner, in combination with the even or uniform lighting the least amount of change, effect or stimulus on the aquatic life 16 is realize by the aquatic life 16. In this manner test results are unlikely to be skewed by effects of general lighting within a dwelling 12.

A control system 118 is electronically connected to the lighting assemblies 38. The control system 118 includes an input 119 for actuating a computing system 120 having programing 122 therein associated with a timing device 124. The control system 118 additionally has a dimming device 126 that is electrically connected to the timing device 124 such that the programing 122 at predetermined periods will automatically dim the lighting assemblies 38 to a predetermined light setting. The control system 118 in one embodiment communicates remotely through over the air communications, via Wifi or as is known in the art to provide lighting and dimming information to an individual having a remote computing device 128 or handheld device 130 having the capability to receive such communication. In one embodiment the computing device 128 or handheld device 130 may be used to communicate instructions to the control system 118 such that the control system 118 is remotely controlled by the remote device 128 or 130. Examples of the remote devices include but are not limited to computers, laptop computers, tablets, Ipads, smartphones, blackberries, remote controls and the like.

The dimming process of the lighting system is designed to afford maximum variability in intensity with very little variation in spectral output. Particularly the spectrum of this lighting system is designed so that dimming of the light does not change the spectral curve and there is an evenness or uniformity of spectral output until the lamp is dimmed to 5% output. At the dimming level of 5% the spectral output becomes predominantly red light or approximately between 630 nm and 750 nm. Specifically red light is the light spectrum that has the lowest level of penetration in water compared to the other visible spectral wavelength, thus again minimizing the effect on the aquatic life 16 the dwelling while providing lighting output for humans or workers within the facility 10. Thus this low lumen level (less than 100 lumens) red light affords an illuminance that is of minimum effect on organisms in the water.

In operation a plurality of light assemblies 38 are installed into a facility 10 and electrically connected to a dimming device 108 having a programmable timer. The assembly is connected within the barn either directly or the body 44 can be attached to provide a retro fit if needed instead of a hard wire connection. In this manner the assembly 38 is modular in design. The programmable timer can then be programmed to provide gradual increases and decreases of lighting at specific times to minimize unnecessary stimuli on the aquatic life 16. When wash down of the facilities 10 is required the assemblies 38 are sprayed with water from a power washer, hose or other water supply. The water then envelopes any dirt, dust, feces or other containments and the frustroconical sections of the assembly 38 allow for easy removal of the containments keeping the assembly 38 and facility clean and sanitary. Because of the water tight seals water does not enter the interior of the assembly 38 again ensuring long life of the assembly 38. Thus, at the very least, all of the stated problems have been overcome.

Figure 8A:
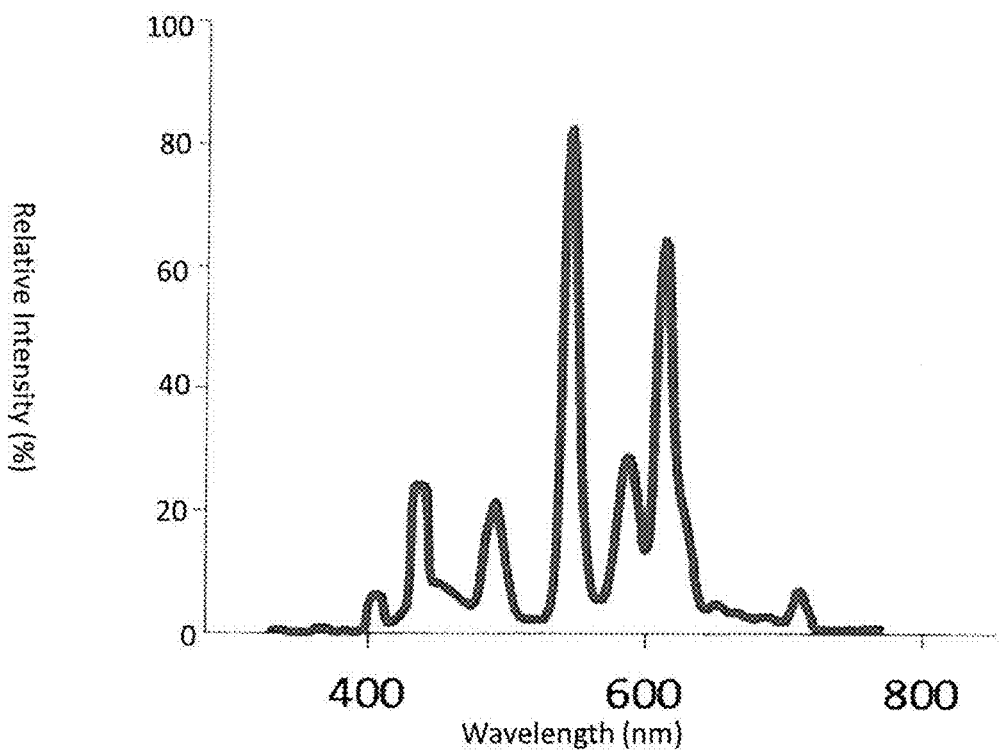
FIG. 8A is a graph showing the relative intensity % of different wavelengths for a lighting device of a lighting system.
Figure 8B:
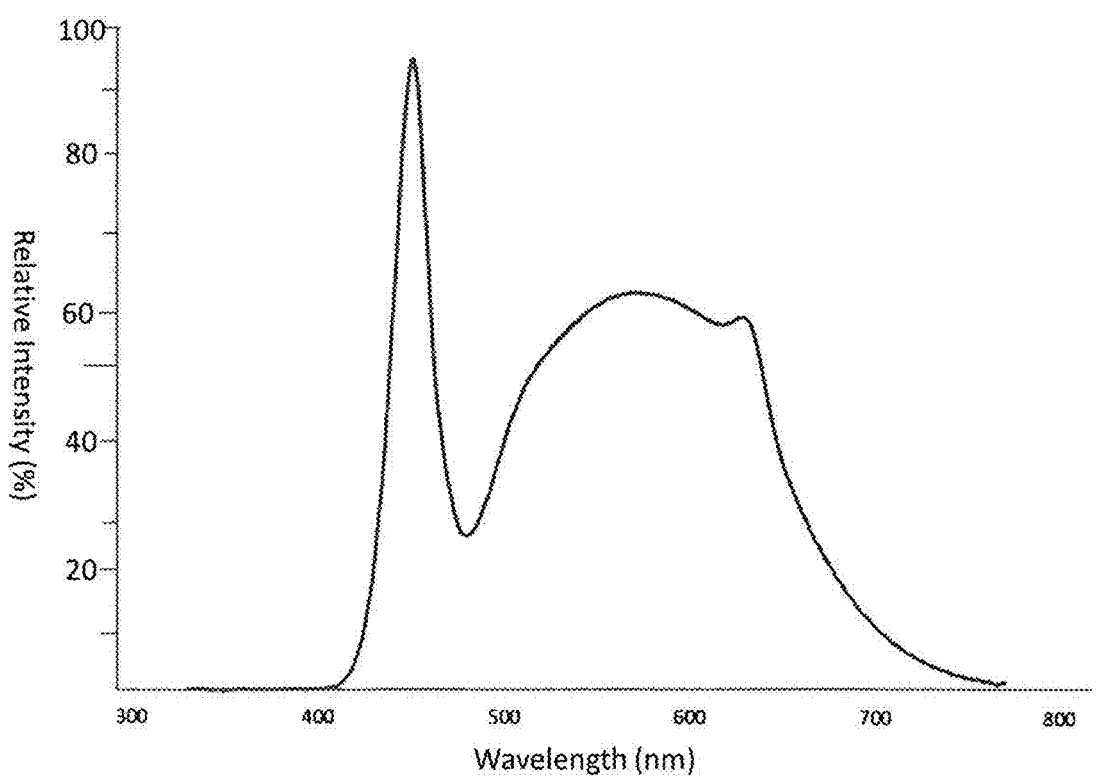
FIG. 8B is a graph showing the relative intensity % of different wavelengths for a lighting device of a lighting system.
Figure 8C:
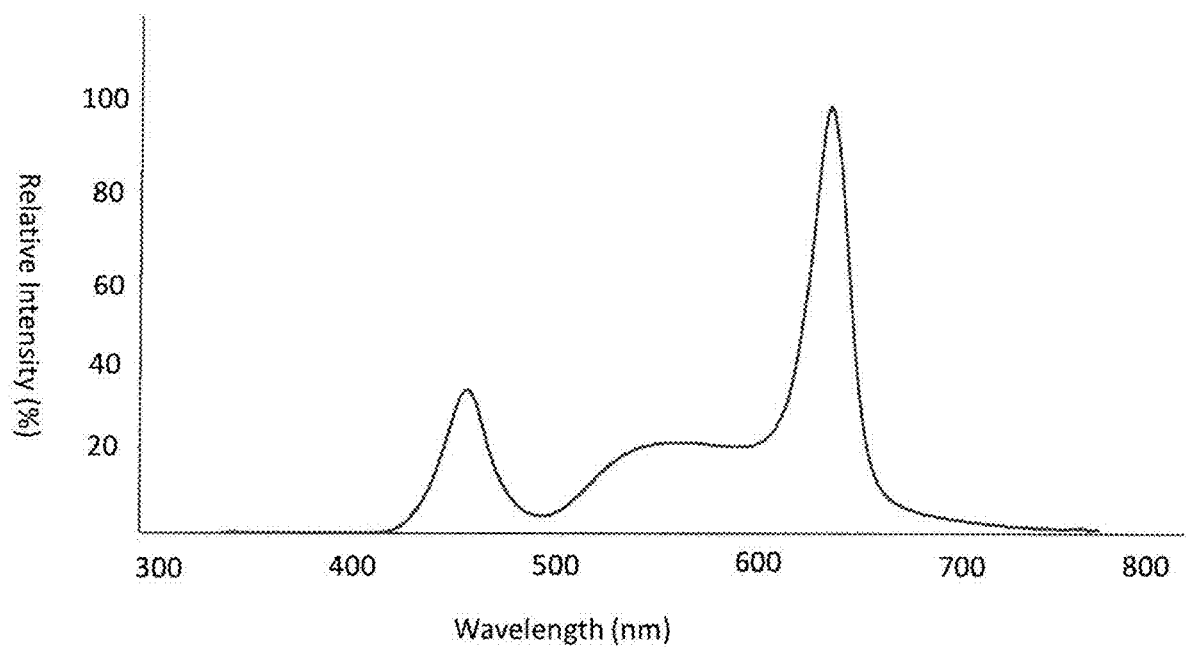
FIG. 8C is a graph showing the relative intensity % of different wavelengths for a lighting device of a lighting system.

FIGS. 8A-8F show the relative intensity % of different light sources used in an experiment on the survival and growth of red drum larvae. FIG. 8A shows the fluorescent control light output while FIGS. 8B-8F show the light output of different lighting devices. In the initial test, the lighting devices of FIGS. 8B-8F having different spectrum of light were measured against a fluorescent control of FIG. 8A all at approximately 300 lux to determine the survival rate of the red drum under each treatment. The spectrums included lighting treatments having spectral content with % of relative luminous power showing peaks at approximately 450 nm, 525 nm and 630 nm (FIG. 8D); another lighting treatment having spectral content with % of relative luminous power showing peaks at approximately 450 nm and 630 nm with the 450 nm peak at approximately 100% (FIG. 8B); another lighting treatment having spectral content with % of relative luminous power showing peaks at approximately 450 nm and 630 nm with a peak at 470 nm added with the 450 nm peak at approximately 100% (FIG. 8F); another lighting treatment having spectral content with % of relative luminous power showing peaks at approximately 450 nm and 630 nm with a peak at 420 nm added with the 450 nm peak at approximately 100% (FIG. 8E); another lighting treatment having spectral content with of relative luminous power with a peak at approximately 630 nm with the 630 nm peak at approximately 100% (FIG. 8C).

In the experiment water tanks were kept at approximate 27° C. and salinity of 32 ppt. Approximately 3000 eggs were placed into each tank and after 10 days the survival rate and growth rate were measured. The tanks themselves were 95 cm in diameter and 38 cm deep. The experiment was replicated 3 times. From this a significant difference in survivability was seen between the different treatments with the control fluorescent light at approximately 10% survival and the treatments of FIG. 8B and FIG. 8D) showing survivability over 20% (FIG. 8B) and 15% (FIG. 8D) respectfully. Meanwhile the treatment of FIG. 8C performed the best with a survival rate of over 35% far out pacing the 10% survival rate of the control.

Figure 8D:
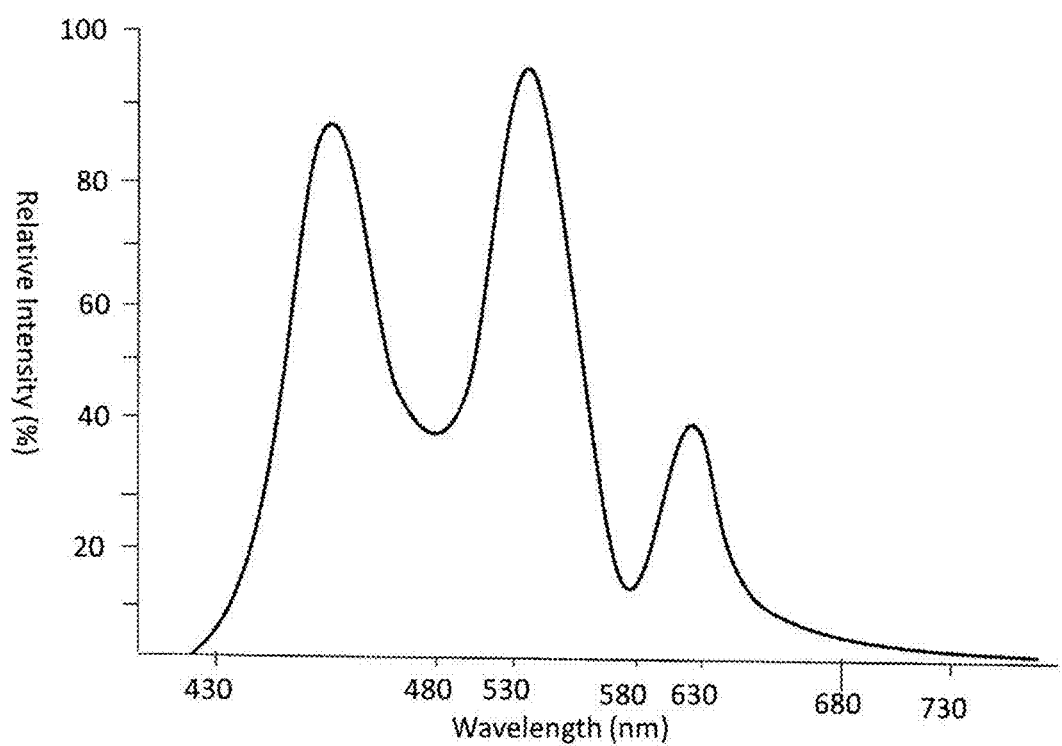
FIG. 8D is a graph showing the relative intensity % of different wavelengths for a lighting device of a lighting system.
Figure 8E:
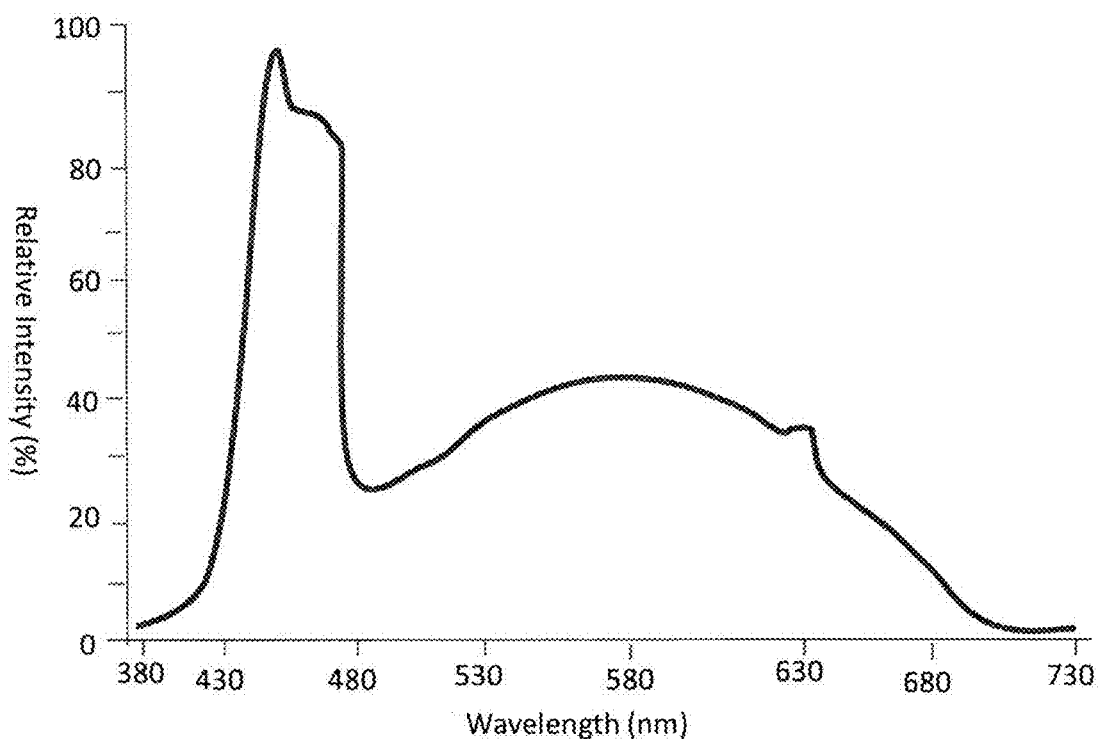
FIG. 8E is a graph showing the relative intensity % of different wavelengths for a lighting device of a lighting system.
Figure 8F:
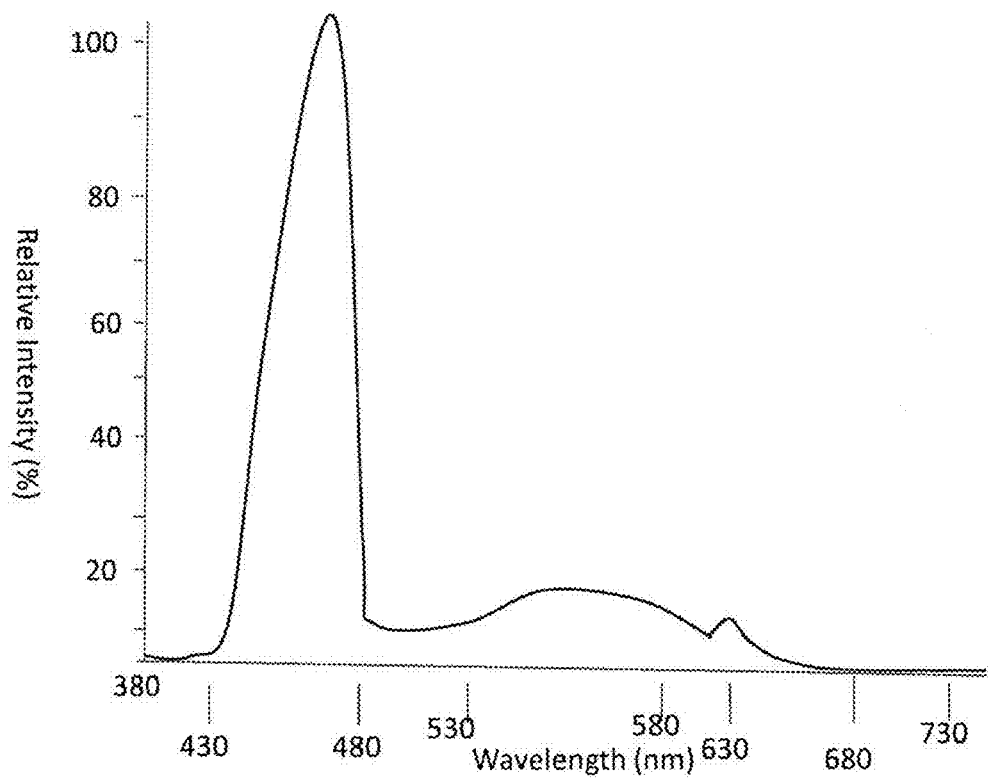
FIG. 8F is a graph showing the relative intensity % of different wavelengths for a lighting device of a lighting system.

In a second experiment the treatments of FIGS. 8B, 8C and 8D again were used, only this time at approximately 600 lux in a first trial and 900 lux for a second trial, again under the same conditions. This time each treatment (FIGS. 8B, 8C and 8D at 600 lux and FIGS. 8B, 8C and 8D at 900 lux) showed over 20% survivability compared to the 10% of the control fluorescent (FIG. 8A) at 300 lux. The treatment of FIG. 8B at 600 lux showed an approximately a 75% survival rate, the treatment, of FIG. 8C at 600 lux showed approximately a 100% survival rate and the treatment of FIG. 8D at 600 lux showed approximately a 20% survival rate. The treatment of FIG. 8B at 900 lux showed approximately a 25% survival rate, the treatment of FIG. 8C at 900 showed approximately a 70% survival rate and the treatment of FIG. 8D showed approximately 60% survival rate. All survival rate far outpaced the control. Thus both spectrum and intensity are shown to directly affect the survivability of the red drum larvae.

Thus presented are apparatus and method of increasing survivability of larvae. By simply providing a spectrum with peaks of % of relative luminous power in a +/− 30 nm range of a predetermined wavelength or alternatively multiple peaks of % of relative luminous power in a +/− 30 nm range of multiple Predetermined wavelengths, survivability is increased unexpectedly over a typical fluorescent light. In one embodiment light sources are operative to produce light having a spectrum substantially concentrated within a specified range of wavelength. A light source is operative to produce light having a spectrum substantially concentrated within the specified range of wavelength (e.g., 420-480 nm, 600-660 nm, or other narrow wavelength range) when over 90% or over 95% of the lighting energy emitted by the light source is within the specified narrow range of wavelengths. In some examples, the light source may thus also emit a small amount of light (e.g., less than 10%, or less than 5% of lighting energy) outside of the specified range.

In addition, intensity of light and choosing a predetermined intensity also unexpectedly increases survivability of larvae over a fluorescent control and over use of spectrum with a % of relative luminous power peak in +/− 30 nm range of a predetermined wavelength. Thus by choosing a predetermined intensity, such as, for example only, approximately 600 lux, or in a narrow range or within +/− 50 lux of a predetermined intensity survivability is unexpectedly increased.

Finally, the combination of using a spectrum of light having multiple peaks of % of relative luminous power in a +/− 30 nm range of multiple predetermined wavelengths and a predetermined intensity to not only unexpectedly increased survivability, but caused approximately 100% survivability. Thus, all of the stated problems have been overcome.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the, ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed:

1. A method of promoting survival of larvae from a plurality of eggs comprising:
    providing a containment unit for housing aquatic life;
    placing a lighting device having a plurality of light emitting diode lighting elements, a heat sink having a plurality of fin elements, and a diffusion element in spaced relation to the containment unit; and
    irradiating a plurality of larvae in the containment unit with the lighting device to promote survival of the larvae;
    wherein the lighting device irradiates a spectrum having a first peak of pre-determined intensity on the larvae selected from the group consisting of 620 nm to 660 nm and a second peak from the group consisting of 430 nm to 470 nm;
    wherein the first peak being at 100% of a relative luminous power of the spectrum and the second peak being at 40% of a relative luminous power of the spectrum.

2. The method of claim 1 wherein the pre-determined intensity of the first peak is in a range between 575 lux and 625 lux.

3. The method of claim 1 wherein the pre-determined intensity of the first peak is in a range between 875 lux and 925 lux.

4. The method of claim 1 wherein the larvae is red drum larvae.

5. The method of claim 1 wherein the heat sink is made of a plastic material.

6. The method of claim 1 wherein the diffusion element is a frustoconical shape having a sidewall that extends from a first end outwardly and downwardly from the heat sink to an open second end having a diameter greater than the diameter of the first end.

7. A method of promoting survival of larvae from a plurality of eggs comprising:
- providing a containment unit for housing aquatic life;
- placing a lighting device having a plurality of light emitting diode lighting elements, a heat sink having a plurality of fin elements, and a diffusion element in spaced relation to the containment unit; and
- irradiating a plurality of larvae in the containment unit with the lighting device to promote survival of the larvae;
- wherein the lighting device irradiates a spectrum having a first peak at 630 nm with the 630 nm peak at 100% of a relative luminous power of the spectrum and a second peak at 450 nm with the 450 nm second peak at 40% of a relative luminous power of the spectrum.

8. The method of claim 7 wherein the lighting device irradiates a pre-determined intensity on the larvae.

9. The method of claim 8 wherein the pre-determined intensity of the first peak is in a range between 575 lux and 625 lux.

10. The method of claim 8 wherein the pre-determined intensity of the first peak is in a range between 875 lux and 925 lux.

11. The method of claim 8 wherein the larvae is red drum larvae.

12. The method of claim 7 wherein the heat sink is made of a plastic material.

13. The method of claim 7 wherein the diffusion element is a frustoconical shape having a sidewall that extends from a first end outwardly and downwardly from the heat sink to an open second end having a diameter greater than the diameter of the first end.

* * * * *